United States Patent

[11] 3,584,139

| [72] | Inventor | Robert A. Swanson<br>Towson, Md. |
|---|---|---|
| [21] | Appl. No. | 787,474 |
| [22] | Filed | Dec. 27, 1968 |
| [45] | Patented | June 8, 1971 |
| [73] | Assignee | Bell Telephone Laboratories, Incorporated<br>Murray Hill, Berkeley Heights, N.J. |

[54] TORQUE-BALANCED COMMUNICATIONS CABLE
5 Claims, 4 Drawing Figs.

[52] U.S. Cl............................................................. 174/103,
174/113, 174/115
[51] Int. Cl......................................................... H01b 7/22
[50] Field of Search........................................... 174/105,
107, 108, 115, 113, 102, 103

[56] References Cited
UNITED STATES PATENTS

| 1,880,060 | 9/1932 | Wanamaker | 174/113X |
|---|---|---|---|
| 2,167,098 | 7/1939 | Wells | 174/103 |
| 2,216,340 | 10/1940 | Elliott | 174/103 |
| 2,754,351 | 7/1956 | Horn | 174/105 |
| 2,953,627 | 9/1960 | Malneritch et al. | 174/102 |

*Primary Examiner*—Lewis H. Myers
*Assistant Examiner*—A. T. Grimley
*Attorneys*—R. J. Guenther and Edwin B. Cave ABSTRACT: This disclosure details a submarine communications cable in which torque balance is supplied by plural strand units applied at points concentric about the cable axis. The units comprise armored wires stranded in a helix of one direction with the strand units applied about the cable in the other direction.

3,584,139

TORQUE-BALANCED COMMUNICATIONS CABLE

GOVERNMENT CONTRACT

The invention herein claimed was made in the course of, or under contract with the Department of the Navy.

FIELD OF THE INVENTION

This invention concerns submarine electrical cable and in particular torque-balanced submarine communications cable capable of being safely and efficiently coiled in the storage tanks of cable-laying ships.

BACKGROUND OF THE INVENTION

Steel wires are used in many submarine cables to supply supportive strength to the cable during the laying operation; and in other cables to provide a protective armored covering around the cable to prevent damage from various environmental hazards. As the wires are normally in the shape of a helix in each case, they have a natural tendency to unravel or straighten out when placed in tension as, for example, during the laying process. If the tendency is not countered, the cable experiences a strong turning moment which can severely stress cable terminations and the cable itself.

In the case of armored cable, the torque typically is balanced by applying armor wire in opposite lays as, for example, a right-hand helix and an overlaid left-hand helix. While thus affording a solution to the torque-imbalance problem, however, this expedient creates a cable structure that is usually very difficult to coil in the cable ship storage tanks.

Specifically, any cable when being coiled will tend to undertake one revolution for each full-circle coil. In the coiling of double lay-armored cable either of two results are possible, depending on the coiling direction. In one case, the armor lays will be forced together and lock. The resultant severe stiffening of the cable makes the coiling task both difficult and hazardous. In the second case, the outer lay forces against the outer jacket or service until relaxation occurs and the outer armor wires basket through at a point. The inner armor lay in this case constricts tightly around the cable proper beneath it, which can cause severe stresses especially in a coaxial unit.

Accordingly, the principal object of this invention is to realize a coilable torque-balanced cable structure.

SUMMARY OF THE INVENTION

The object is achieved pursuant to the invention by surrounding a cable core with a plurality of unique stranded units. Each unit consists of a plurality of armor wires helically applied to a hard plastic rod. The units are applied to the core in a helical lay opposite to the direction of armor wire helices.

In a specific embodiment, a coaxial cable core is surrounded with a plurality of armor strand units. Each unit consists of a plurality of armor wires helically applied to a polyethylene rod. The units are then applied to the core in a lay opposite to the direction of the armor wire helices. Torque balance is provided by the opposition of these forces as the cable is placed in tension. With a preferred lay length ratio of about 20:1, this cable can be coiled without the basketing or crushing problems such as prevent coiling of double armor reverse lay cable. The present cable is very strong relative to its weight.

The invention, its objects, features and advantages will be readily apprehended from a reading of the below description of an illustrative embodiment.

DETAILED DESCRIPTION OF AN ILLUSTRATIVE EMBODIMENT

Figure 1:
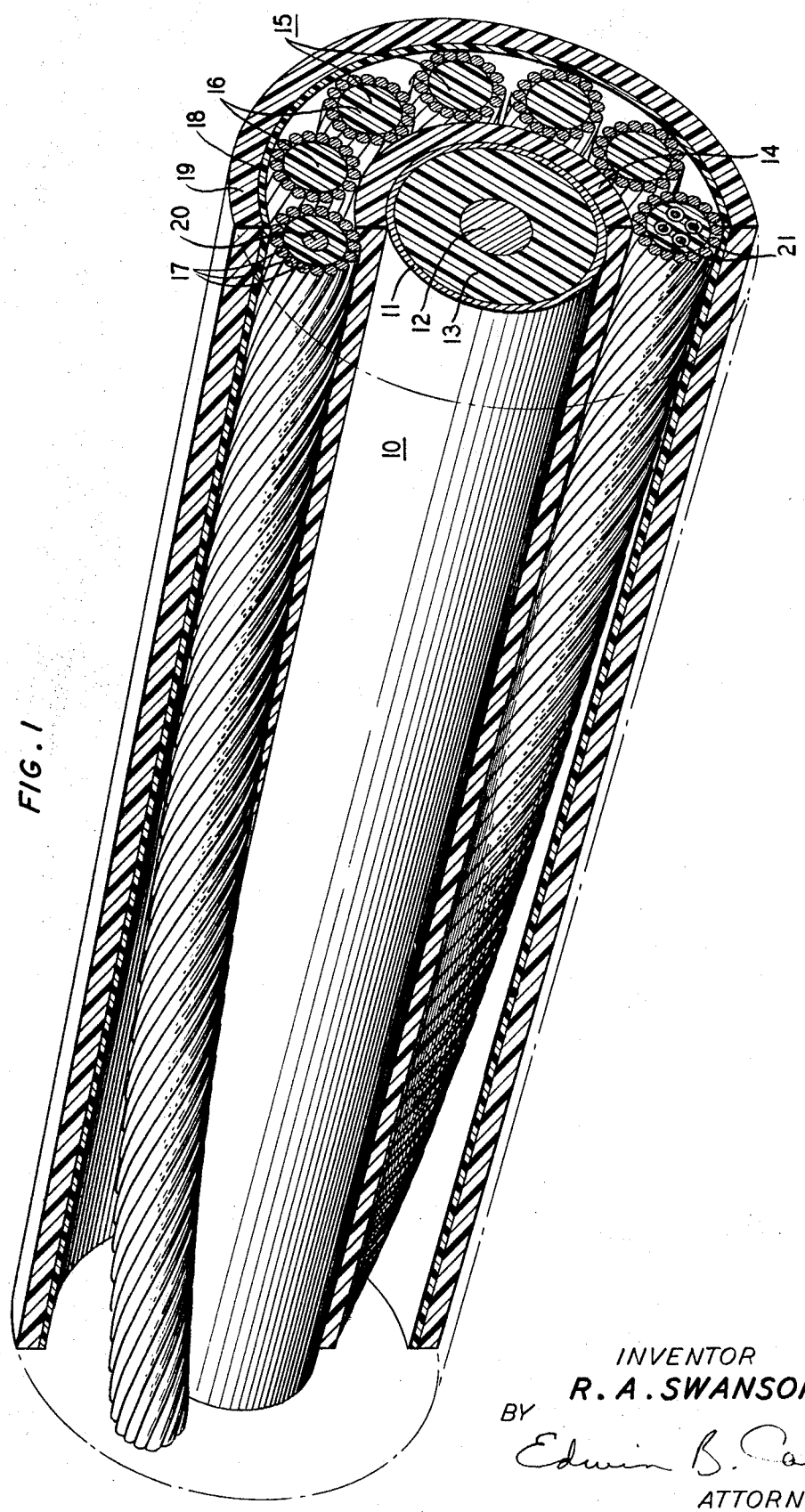
FIG. 1 is a showing in side perspective of a partial breakaway view of a cable embodying the invention.

The cable consists, first, of a core 10, which in the present illustration is a coaxial cable comprising an outer conductor 11 and an inner conductor 12 separated by a solid dielectric 13 of polyethylene. Core 10 can, however equally well be a plurality of coaxial lines, a plurality of conductor pairs, or any combination thereof. It is preferable to surround the core 10 with a conventional protective jacket 14 of polyethylene.

The layer incorporating the present inventive concept consists of a plurality of armor strand units, each designated 15. Each unit 15 consists of a plastic rod 16 advantageously of extruded polyethylene, around which a plurality of conventional steel armor wires 17 are applied in a helix of a first or clockwise direction. Rod 16 advantageously carries substantially zero load, thus enabling a maximum torque-tension coupling to be realized. This point is very important since it permits torque balance to be achieved with currently practical lay lengths.

The function of rod 16 is to aid in the maintenance of a circular cross-sectional configuration for the wires 17 stranded around the rod, by preventing the wires from basketing inward. In fulfilling this function, it is essential in the present invention that the material chosen for rod 16 have a modulus of elasticity substantially lower than the steel of the wires 17. Preferred materials include polyethylene, natural or synthetic rubbers; although fibrous materials such as cotton or hemp made into a rope are also practicable.

The units 15 are applied helically around jacket 14 in a direction counter to the helices given to wires 17. The cable is completed with a layer 18 of Mylar tape and finally an outer jacket 19 of polyethylene. The tape (polyethylene terephthalate) or a material of like surface friction, 18 prevents the outer jacket 19 from interlocking the strand units 15.

Figure 2B:
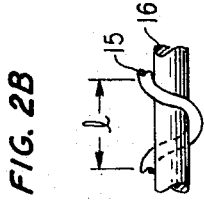
FIGS. 2A—2C are schematic diagrams of aspects of the cable.
Figure 2A:
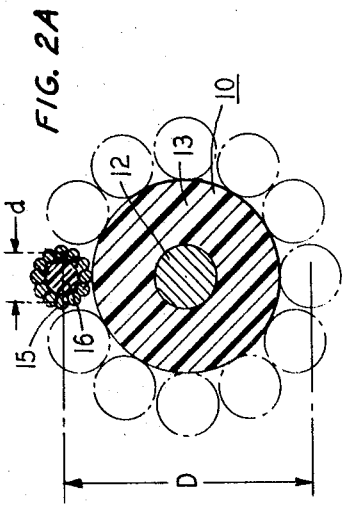
Figure 2C:
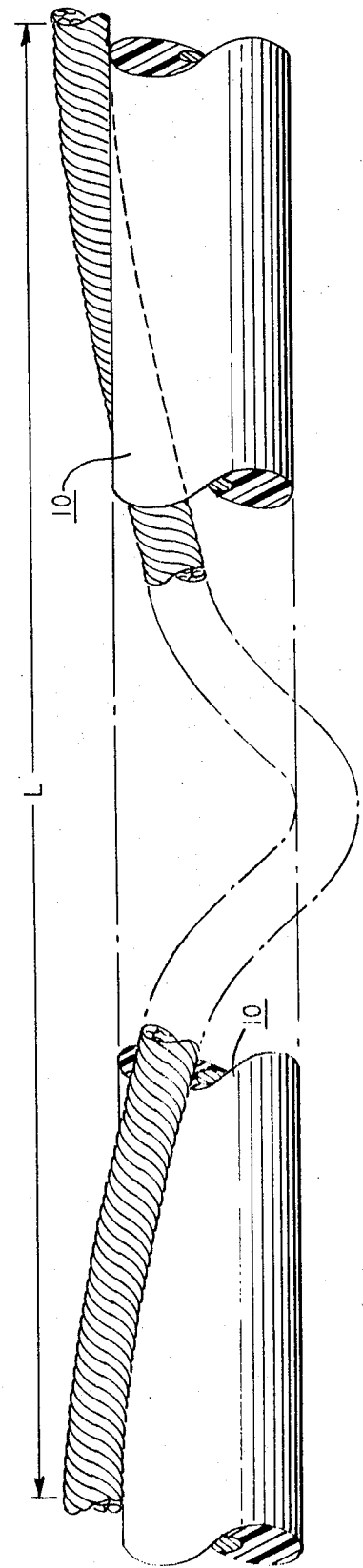

FIGS. 2A, 2B, and 2C depict schematically the torque-balancing mechanisms and certain important dimensional considerations. In these FIGS., L is the lay length of the armor units 15 around the core 10, or the jacket 14; D is the diameter of the circle about the cable core which contains the axes of the armor units 15; $l$ is the lay length of the wires 17 in the units 15; and $d$ is the diameter of the circle about the armor unit 15 containing the axis of the individual armor wires. The diameter $d$ of the armor unit 15 typically is 0.40 inch, which is considerably less than the overall cable diameter D which is in the range of 1.4 to 1.75. It therefore is desirable to achieve a high torque-tension coupling in each unit 15. The single layer of high strength steel wires 17 on the rod 16 are applied with a relatively high lay angle of, for example, 30° as a preferred means of achieving this end.

Neglecting internal friction and other nonlinear effects, torque balance of the cable will be realized when $$L/l = AD_2/d_2$$

The maximum value of L probably is in the range 40—45 inches; while the minimum value of $l$ is about 2 inches. A value of the ratio $L/l$ readily realizable and also affecting torque balance typically is 20:1.

Application of the inventive teachings makes possible an overall cable torque-tension relationship in which a maximum tensile load of 100,000 pounds produces less than 100 pounds of torque.

It is necessary in some cable structures to incorporate conductors for DC power return into the rods 16, one such conductor 20 being shown for illustration in FIG. 1. Where desired, several insulated conductors can also be incorporated into the rod 16, such as the group denoted 21 in FIG. 1.

Cables constructed pursuant to the present invention exhibit substantially none of the stiffening or basketing problems characteristic of many prior art cables during coiling. Although the cable is subject to the same twisting factors during coiling, these effects are greatly reduced because all of the strand units are applied helically in the same direction over the cable core.

It should be stressed that the basic torque-balancing inventive concept calls only for a plurality of armor units as above described, and having a first direction of helical lay about a supporting rod, to be stranded around a cable core in a direction opposite to the first. It is not necessary that the units contact the core or each other in a continuous circle about the core. It is permissible to substitute for a given one or two strand units, a different type of member of the same diameter as the units, such as a heavily insulated conductor, provided that the symmetry is not unduly upset. The invention also embraces multiple layers of such units. Further, the torque-balancing strand units 15 need not be the final layer of the cable prior to the outer insulative jacket or service.

The spirit of the invention is embraced in the scope of the claims to follow.

I claim:

1. A submarine communications cable comprising: a core comprising conductor paths; and a plurality of armor strand units surrounding said core, each unit comprising a plurality of armor wires stranded around a nonload carrying element in helices of a first lay direction said units being stranded around said core in helices opposite in lay direction to that of said armor wires; said element having a substantially lower elastic modulus than said armor wires; and said units being structured such that when said cable is in tension the torsional forces resulting from said first lay direction of said armor wires is substantially counterbalanced by the torsional forces resulting from said opposite lay direction of said units.

2. A submarine cable pursuant to claim 1, wherein said core comprises a coaxial line, wherein each said element is substantially circular in cross section, and wherein said armor wires are stranded directly around said element.

3. A submarine cable pursuant to claim 2, further comprising: an outer plastic jacket enveloping said strand units, and a layer of material disposed between said units and said outer jacket, said material having surface friction characteristics sufficiently low to prevent said outer jacket from interlocking said strand units.

4. A submarine cable pursuant to claim 2, wherein the ratio of armor wire lay length to strand unit lay length is substantially 20:1.

5. A submarine cable pursuant to claim 2, wherein said armor wires comprise a single layer of high strength steel applied helically around each said element at a lay angle of approximately 30°, and wherein said element is a polyethylene rod.